US008018852B2

(12) United States Patent
Olakangil et al.

(10) Patent No.: US 8,018,852 B2
(45) Date of Patent: Sep. 13, 2011

(54) EQUAL-COST SOURCE-RESOLVED ROUTING SYSTEM AND METHOD

(75) Inventors: Joseph Olakangil, Salt Lake City, UT (US); Sahil Dighe, Salt Lake City, UT (US); Kishore C Rao, Midvale, UT (US)

(73) Assignee: Alcatel Lucent, Paris (FR)

( * ) Notice: Subject to any disclaimer, the term of this patent is extended or adjusted under 35 U.S.C. 154(b) by 1120 days.

(21) Appl. No.: 10/746,056

(22) Filed: Dec. 24, 2003

(65) Prior Publication Data

US 2005/0041590 A1 Feb. 24, 2005

Related U.S. Application Data

(60) Provisional application No. 60/497,074, filed on Aug. 22, 2003.

(51) Int. Cl.
*G01R 31/08* (2006.01)

(52) U.S. Cl. ......... 370/238; 370/229; 370/400; 370/401

(58) Field of Classification Search ............... 370/238, 370/392, 389, 255, 239, 401, 409, 386, 235
See application file for complete search history.

(56) References Cited

U.S. PATENT DOCUMENTS

| | | | | |
|---|---|---|---|---|
| 5,394,393 A * | 2/1995 | Brisson et al. | ............... | 370/392 |
| 5,566,170 A * | 10/1996 | Bakke et al. | ............... | 370/392 |
| 6,633,544 B1 * | 10/2003 | Rexford et al. | ............... | 370/238 |
| 6,646,989 B1 * | 11/2003 | Khotimsky et al. | ............ | 370/238 |
| 6,721,800 B1 * | 4/2004 | Basso et al. | ................. | 709/239 |
| 6,731,599 B1 * | 5/2004 | Hunter et al. | ................. | 370/229 |
| 6,888,838 B1 * | 5/2005 | Ji et al. | .................... | 370/401 |
| 6,987,735 B2 * | 1/2006 | Basso et al. | .................... | 370/238 |
| 7,190,696 B1 * | 3/2007 | Manur et al. | .................. | 370/392 |
| 2002/0172203 A1 * | 11/2002 | Ji et al. | .......................... | 370/392 |
| 2003/0137978 A1 * | 7/2003 | Kanetake | ...................... | 370/386 |
| 2003/0223413 A1 * | 12/2003 | Guerrero | ...................... | 370/389 |

OTHER PUBLICATIONS

Villamizar, Curtis: "OSPF Optimized Mulipath" Internet Citation, [Online] XP002195148 Retrieved from the Internet: URL:http://www.watersprings.org/pub/id/draft-ietf-ospf-omp-02.txt.

* cited by examiner

*Primary Examiner* — Ricky Ngo
*Assistant Examiner* — David Oveissi
(74) *Attorney, Agent, or Firm* — RG & Associates

(57) ABSTRACT

A method and system for augmenting routing decisions in a network switching device with topology information acquired using source learning are disclosed. In the preferred embodiment, the method of selecting a port to transmit an outbound flow from a first node to a second node comprises the steps of identifying a plurality of ports associated with minimal equal-cost paths from the first node to the second node, and if an inbound flow from the second node is detected on a first port of the plurality of ports of the first node, then transmitting the outbound flow from the first port. In the absence of an inbound flow from the second node, the first node generally selects the port for the outbound flow from the plurality of minimal equal-cost paths. The present invention allows a switching device to take advantage of the path determination made at another router in the network while avoiding inconsistencies between conventional route selection operations and IP source learning in switching devices adapted to perform bridging on IP address.

18 Claims, 3 Drawing Sheets

EQUAL-COST SOURCE-RESOLVED ROUTING SYSTEM AND METHOD

CROSS REFERENCE TO RELATED APPLICATION

This application claims the benefit of U.S. provisional application Ser. No. 60/497,074, entitled "EQUAL-COST SOURCE-RESOLVED ROUTING SYSTEM AND METHOD," filed Aug. 22, 2003, the contents of which is hereby incorporated herein by reference for all purposes.

FIELD OF INVENTION

The invention generally relates to a port selection technique used in a network switching environment where there are multiple equal-cost paths between two nodes. In particular, the invention relates to a method and system for selecting an outbound port among a plurality of ports associated with minimal equal-cost paths using network layer source learning.

BACKGROUND

In an Internet Protocol (IP) network or other packet-switched network, packets are frequently transmitted through many intermediate routers between a source node and a destination node. At each of these intermediate routers traversed in the path, the next-hop in the path to the destination node is determined. The next-hop is commonly selected from a plurality of potential next-hop routers based upon the routing tables compiled at the node.

In routers enabled with the Open Shortest-Path First (OSPF) protocol, for example, the next-hop selected is associated with the "shortest path" to the destination node. The shortest path is generally the least costly path measured as a function of one or more metrics. Routers exchange these cost metrics using link-state advertisements that are flooded through the network. Upon receipt of a link-state advertisement, the recipient router retains a copy in its link-state database and then propagates the update to other routers.

After the link-state database of each router is completed, the routers generate a Shortest Path Tree to all destinations nodes using Dijkstra's algorithm. The destinations nodes, the associated cost, and the next-hop to reach those destinations form the routing table.

The cost may be based on bandwidth, the expense of a leased line, or administrator assignment, for example. The bandwidth of an interface represents the overhead required to send packets across an interface, and the associated bandwidth cost is inversely proportional to the bandwidth of that interface. The cost of a path between the source and destination nodes is then the sum of the costs associated for all the interfaces traversed between the source and destination nodes.

If the destination node is reachable through a plurality of interfaces, a router will generally transmit the packet toward the destination node using the interface associated with the minimal cost path. In some cases, however, multiple paths may have the same minimal path cost. While each of the associated interfaces may be used to transmit a packet to the destination with minimal cost, the router generally assigns a single interface from which to transmit all outbound packets of a flow to assure the packet order is preserved. A router may employ a round-robin scheme to assign each new outbound flow to one of the plurality of minimal equal-cost paths.

In a number of routers, the interface assigned to an outbound flow need not be the same as the interface of the corresponding inbound flow received. In some devices configured to perform "source learning" on network layer addresses, however, conflicts can occur if the outbound interface assigned is different than the interface on which inbound traffic from the same flow is received. There is therefore a need to reconcile inconsistencies between the inbound interface on which traffic is learned and the outbound interface to which outbound traffic is assigned while still providing the port assignment scheme flexibility needed to perform load balancing, for example.

SUMMARY

The present invention features a method and system for augmenting routing decisions in a network switching device with topology information acquired using source learning. In the preferred embodiment, the equal-cost source-resolved (ECSR) port selection method for transmitting an outbound flow from a first node to a second node comprises the steps of identifying a plurality of ports associated with minimal equal-cost paths from the first node to the second node, and if an inbound flow from the second node is detected on a first port of the plurality of ports of the first node, then transmitting the outbound flow from the first port. The minimal equal-cost paths are generally derived from route information exchanged between the first node and one or more other routing devices. In addition, the first node may also learn of other nodes in the network through source learning operations in which the network addresses of inbound flows are associated with the port on which they are received. In the absence of an inbound flow from the second node, the first node generally selects the port for the outbound flow from the plurality of ports associated with the minimal equal-cost paths using round robin, for example.

The present invention therefore allows a switching device to take advantage of the path determination made at another router in the network while avoiding inconsistencies between conventional route selection operations and source learning in switching devices adapted to perform bridging on network addresses instead of physical addresses.

BRIEF DESCRIPTION OF THE DRAWINGS

The present invention is illustrated by way of example and not limitation in the figures of the accompanying drawings, and in which.

DETAILED DESCRIPTION

Figure 1:
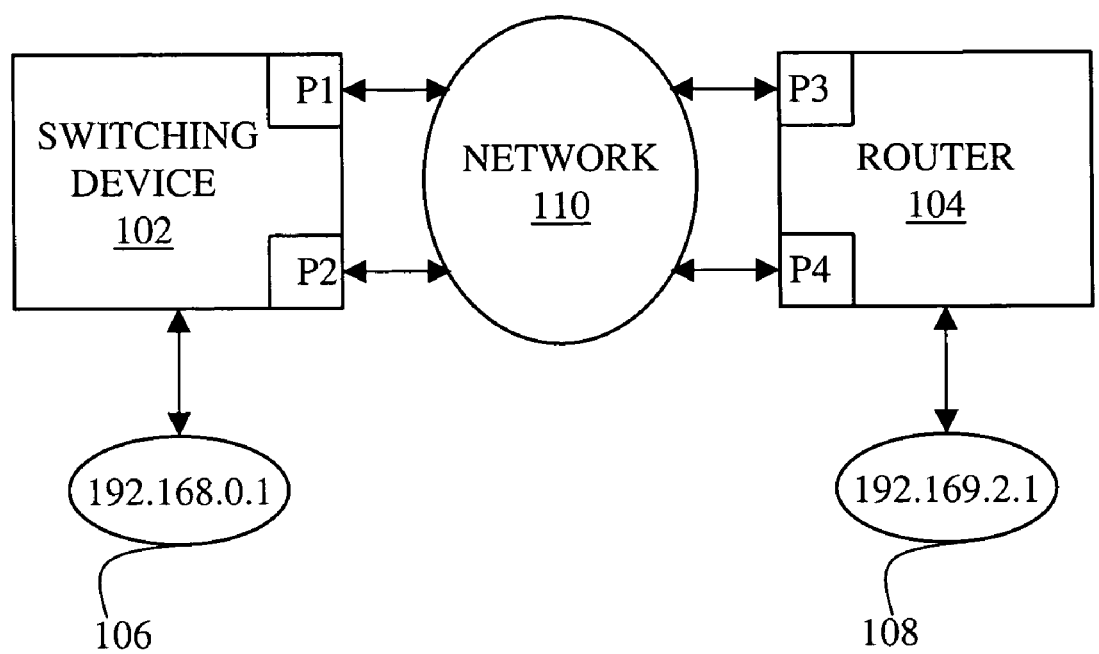
FIG. 1 is a functional block diagram of a network including an equal-cost source-resolved switching device, according to the preferred embodiment of the present invention.

Illustrated in FIG. 1 is a functional block diagram of a network including an equal-cost source-resolved (ECSR) switching device 102, according to the preferred embodiment of the present invention. The switching device 102 is operably coupled to an end station 106 having the IP address 192.168.0.1 as well as a router 104 via the network 110. The switching device 102 is operably coupled to the network 110 by means of a plurality of interfaces including port P1 and port P2, preferably Ethernet ports. The router 104 comprises a plurality of interfaces including ports P3 and port P4, and is operatively coupled to a second edge device 108 having the IP address 192.169.2.1. The switching device 102 and router 104 are two of a plurality nodes and other addressable entities operatively coupled to network 110, which may further include one or more local area network (LANs), wide area network (WANs), or metropolitan area network (MANs), or combinations thereof, for example.

For purposes of illustration, the path between port P1 and port P3 and the path between port P2 and port P4 are minimal equal cost paths. As such, the switching device 102 has the option of assigning the first port P1 or second port P2 to be the designated outbound port for purposes of transmitting traffic from the first end station 106 to the second end station 108. As a rule, each new outbound flow detected at the switching device 102 is assigned a particular outbound interface through which each of the PDUs of the flow are transmitted. Using the same outbound interface for each PDU minimizes the probability of PDUs of a flow arriving at the destination out of sequence.

Figure 2:
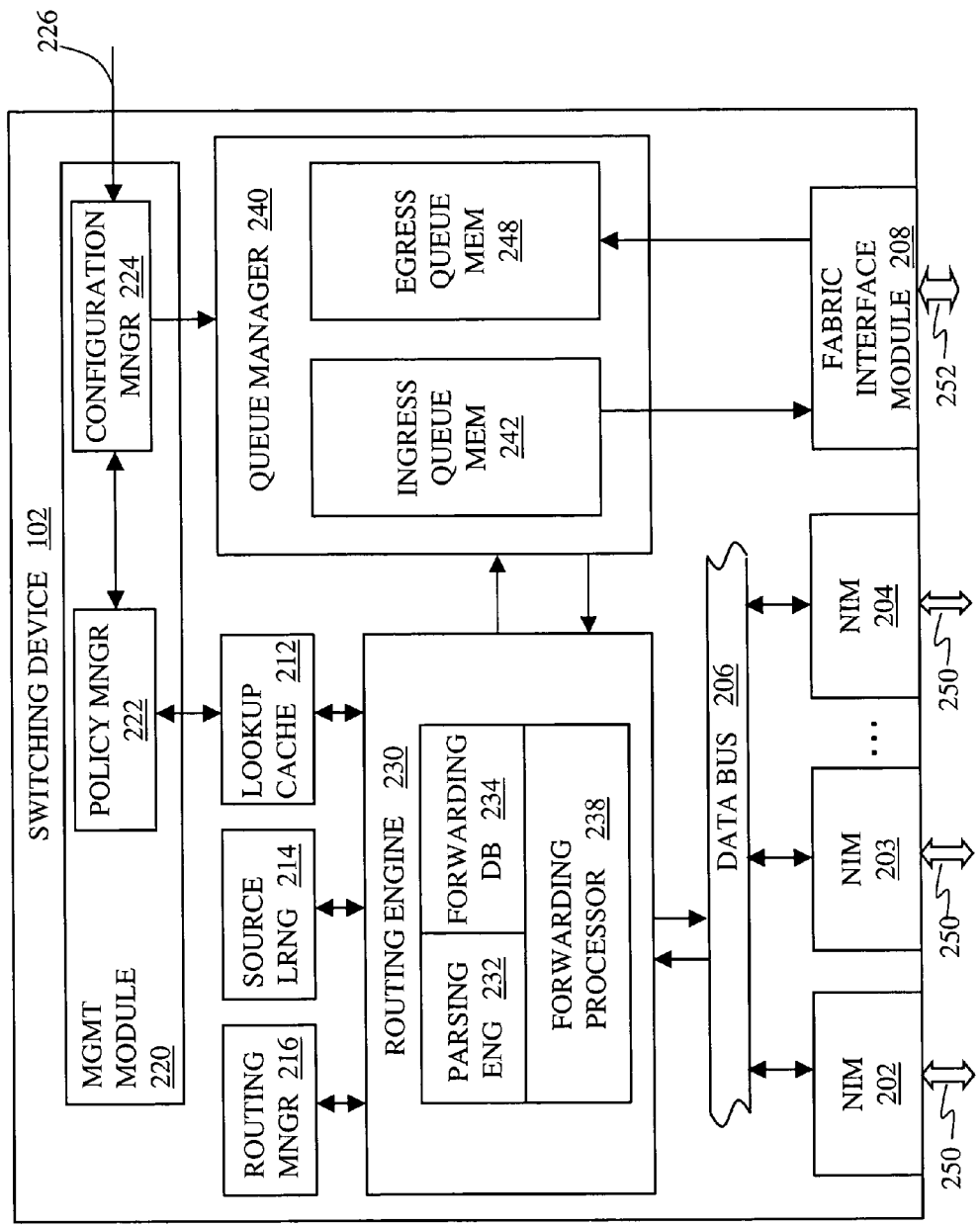
FIG. 2 is a functional block diagram of an equal-cost source-resolved switching device, according to the preferred embodiment of the present invention.

Illustrated in FIG. 2 is a functional block diagram of a switching device for performing the ECSR port selection method, in accordance with the preferred embodiment. The switching device 102 of the preferred embodiment comprises a plurality of network interface modules (NIMs) 202-204, one or more routing engines 230, a queue manager 240, and a management module 220. Each of the NIMs 202-204 comprises one or more external ports, i.e., interfaces, operably coupled to a communications link (not shown) for purposes of receiving and transmitting inbound and outbound data traffic, respectively. The interfaces may be physically organized in one or more slots or switch modules that are detachably attached to a common back plane with switch fabric (not shown). The duplex traffic flows 250 representing inbound and outbound flows comprising one or more protocol data units (PDUs) are then conveyed between the routing engine 230 and the plurality of NIMs 202-204 via one or more internal data buses 206.

The management module 220 generally comprises a policy manager 222 for retaining and implementing traffic policies uploaded to a configuration manager 224 by a network administrator using simple network management protocol (SNMP) messages 226, for example. In the preferred embodiment, the policy rules preferably comprise: (a) routing information, (b) quality of service (QoS) rules, (c) class of service (CoS) rules, or combinations thereof. One or more local copies of the policy rules are preferably retained in high speed look-up cache 212 where they are available in real-time to the routing engine 230 operating at wire speeds.

The routing engine 230 of the preferred embodiment is generally capable of, but not limited to, performing layer 2 switching operations and layer 3 routing operations using layer 2 through 7 information, as defined in the Open Systems Interconnect (OSI) reference model. The routing engine 230 preferably comprises a parsing engine 232, a forwarding database 234, and forwarding processor 238. The parsing engine 232 decapsulates the incoming PDUs of the ingress data stream, extracts one or more bits from one or more header(s), and outputs source and destination address information used to make forwarding decisions and identify traffic flows.

The data link layer destination address, e.g., the destination media access control (MAC) address, is searched in an address table of the forwarding database 234 to determine whether to forward the PDU to a specific port, discard the PDU, or flood it to all ports. The source IP address, and the source MAC address in some embodiments, is used by the source learning module 214 to update and refresh the address table as needed to associate each addresses detected with the port on which it may be reached. Frames directed to an end station attached to the switching device 102 are transparently switched to the outbound port learned in the address table. If the destination address of the inbound PDU indicates a destination node outside the immediate network domain of the switching device 102, the switching device attempts to route the PDU toward the network including the destination. In the preferred embodiment, the IP destination address is used as a key into a routing table in the forwarding database 234 where it is compared against known network addresses in accordance with route lookup activity. If the IP destination address matches an entry in the routing table, the associated MAC address of an adjacent device to which the packet is to be forwarded, i.e., the next-hop address or the destination swap entry, and the associated output interface are retrieved and conveyed to the forwarding processor 238.

In addition to the IP addresses acquired by the source learning module 214, the routing information in the forwarding database 234 may further include IP addresses compiled by a routing manager 216 that exchanges routing information and periodic updates with other routers to determine the network topology and route metrics. Where there are two or more potential paths through the network 110 to a destination node, the routing manager 216 selects a best path having the least cost metric. The output port for the selected path is incorporated into the routing table of the forwarding database 234 along with the associated MAC address.

In the preferred embodiment, the routing manager 216 and forwarding database 234 are embodied in a Media Switch IXE2424 10/100+Gigabit L21314 Advanced Device manufactured by INTEL® of Santa Clara, Calif. In some implementations of the Media Switch IXE2424, the next-hop address or destination swap entry retained in the routing table of the forwarding database 234 must be the same as the address table also of the forwarding database 234. Inconsistencies between the IP address and MAC address entry in the routing table and one or more IP addresses and MAC addresses acquired by the source learning module 214 may introduce performance irregularities. Such an inconsistency may arise where the assigned outbound port for a flow of a given conversation is different than the port on which the conversation is received, which is possible where the remote host device is reachable through a plurality of minimal equal-cost paths.

To avoid such inconsistencies between the routing table and address table, the routing manager 216 of the preferred embodiment is adapted to override the outbound port assignment in the routing table when traffic is received from the same network address but on a different minimal equal-cost path. In this case, the routing manager 216 assigns or reassigns the outbound flow associated with a particular IP address to the same port on which the corresponding inbound flow is received. The MAC address of the destination device or gateway associated with the IP address is generally learned using an address resolution protocol (ARP), although it may also be learned in some implementations from the inbound flow, for example.

Once the proper next-hop address MAC address and outbound interface are determined for the outbound flow, the forwarding processor 238 encapsulates the packet with a data link layer header before transmitting the frame to the queue manager 240. The new frame is then enqueued in the ingress queue memory 242, conveyed to the proper outbound port of the egress switching device via the switch fabric (not shown) via the fabric interface module 208, and transmitted toward the destination node. The outbound port is preferably the same port on which inbound traffic from the same domain is received, if applicable.

Figure 3:
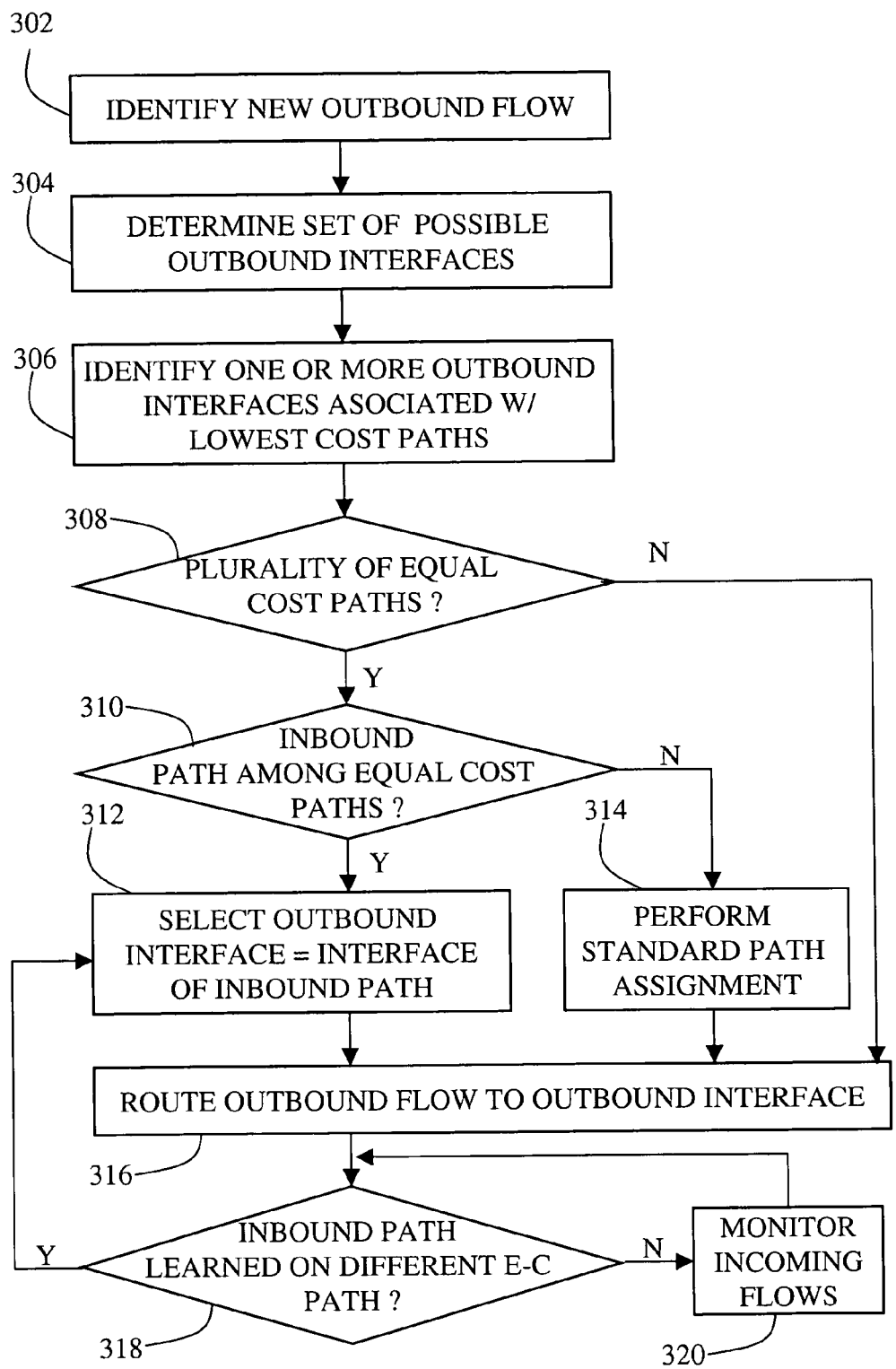
FIG. 3 is a flow chart of the equal-cost source-resolved port selection method, according to the preferred embodiment of the present invention.

Illustrated in FIG. 3 is a flow chart of the equal-cost source-resolved (ECSR) port selection method according to the preferred embodiment of the present invention. In the course of routing one or more flows through the switching device 102, the routing engine 230 periodically identifies a new outbound traffic flow (step 302). A new outbound flow is a flow for which there is no existing next-hop entry in the routing table of forwarding database 234. A traffic flow as used herein refers to a set of one or PDUs satisfying a common policy, the policy defined by one or more criteria that may include the destination address and higher layer protocol information, for example.

After identifying a new flow (step 302), the routing manager 216 determines (step 304) whether the set of outbound interfaces, through which the destination node associated with the new flow is directed, is reachable. The routing manager 216 then identifies (step 306) the one or more minimal equal-cost interfaces. If there is only one minimal equal-cost path, the ECMP test (step 308) is answered in the negative and the interface associated with the single minimal cost path is assigned as the outbound interface for purposes of transmitting (step 316) the new outbound flow.

If there are two or more minimal equal-cost paths, the ECMP test 308 is answered in the affirmative and routing manager 216 determines whether an incoming flow for the same conversation has been received from the destination node associated with the new flow. If the IP address of the destination node was previously learned by the source learning module 214 and has not expired, the learned path test 310 is answered in the affirmative and the outbound interface assigned (step 312) to be the inbound interface. The new outbound flow is then transmitted (step 316) through the same interface on which the inbound flow was received from the destination node. In this manner, the switching device may take advantage of the equal-cost, multi-path (ECMP) computation made by another router in the network.

If there are multiple minimal equal-cost paths and no preceding inbound traffic from the destination for which the outbound interface is being selected, the routing manager 216 assigns (step 314) the outbound interface using conventional assignment criteria. In the preferred embodiment, the outbound interface is selected from the plurality of minimal equal-cost paths using a round-robin scheme. The assigned interface is used to transmit (step 316) each PDU of the new outbound flow.

If the routing manager 216 later detects or otherwise learns of an inbound flow associated with a conversation for which there is an existing outbound flow, and the inbound flow and outbound flows are on different minimal equal-cost paths, the inbound flow test 318 is answered in the affirmative and the existing outbound flow assigned to the interface associated with the newly detected inbound flow of the same conversation. After an outbound port assignment is made, the ECSR switching device 102 continues to monitor (step 320) incoming flows to maintain consistency between the inbound and outbound ports.

Referring once again to FIG. 1, the ECSR port selection method of the preferred embodiment may be employed by the switching device 102 to choose the appropriate interface with which to route a flow from the first end station 106 to the second end station 108. Upon receipt of the first PDU of a flow, the switching device 102 detects the new flow and identifies the two equal cost paths associated with port P1 and port P2. The switching device 102 first tests to determine if any inbound packets of the same flow have been received on either port P1 or port P2. If, for example, traffic from the second edge device 108 to the first edge device 106 was previously detected by and learned on port P2, then the learned path test 310 of FIG. 3 is answered in the affirmative and the switching device 102 assigns port P2 as the outbound port for the new flow to the second edge device 108. All subsequent PDUs of the outbound flow from first edge device 106 to the second edge device 108 are then transmitted using P2. Prior to receiving any inbound flow from the second edge device 108 to the first edge device 106, the learned path test 310 is answered in the negative and the outbound port assigned using conventional techniques such as round robin. Using round robin, port P1 or port P2 may be assigned for purposes of the new outbound flow depending on any previous port assignments that have been made and the load on those ports.

Although the description above contains many specifications, these should not be construed as limiting the scope of the invention but as merely providing illustrations of some of the presently preferred embodiments of this invention.

Therefore, the invention has been disclosed by way of example and not limitation, and reference should be made to the following claims to determine the scope of the present invention.

We claim:

1. A equal-cost source-resolved (ECSR) port selection method for transmitting an outbound flow, for a conversation, from a first node to a second node in a distributed network comprising one or more routing devices, the method comprising the steps of:
    at a switching device:
        identifying a plurality of ports associated with minimal equal-cost paths from the first node to the second node;
        if an inbound flow, for the conversation, received from the second node is detected on a first port of the plurality of ports of the first node, then associating a network address of the inbound flow with the first port on which it was received; and
        transmitting the outbound flow from the first port of the first node to the second node based on the network address associated with the inbound flow.

2. The ECSR port selection method of claim 1, wherein the minimal equal-cost paths are derived from route information exchanged between the first node and the one or more routing devices in the distributed network.

3. The ECSR port selection method of claim 1, wherein the method further includes, after the inbound flow, for the conversation, from the second node is detected, the step of retaining the network address associated with the inbound flow, for the conversation, at a forwarding database maintained by the first node.

4. The ECSR port selection method of claim 3, wherein the forwarding database comprises entries relating one or more network addresses to an associated inbound port of the plurality of ports.

5. The ECSR port selection method of claim 1, wherein the inbound flow, for the conversation, from the second node is detected using a network address source learning.

6. The ECSR port selection method of claim 5, wherein the source learning associates a source IP address retrieved from one or more inbound protocol data units, for the conversation, (PDUs) with the port on which the one or more inbound PDUs are received.

7. The ECSR port selection method of claim 1, wherein the method further includes the step of, if an inbound flow, for the conversation, from the second node is not detected on the plurality of ports, transmitting the outbound flow, for the conversation, from a port selected from the plurality of ports associated with the minimal equal-cost paths.

8. The ECSR port selection method of claim 7, wherein the selected port is chosen using round robin.

9. The ECSR port selection method of claim 7, wherein the port on which the outbound flow, for the conversation, is transmitted is reassigned from the selected port to the first port after the inbound flow, for the conversation, from the second node is detected.

10. A equal-cost source-resolved (ECSR) switching device for transmitting an outbound flow, for a conversation, to a second node, wherein the switching device:
 identifies a plurality of ports associated with a minimal equal-cost path from the switching device to the second node;
 if an inbound flow, for the conversation, from the second node is not detected on the plurality of ports of the first node, then the switching device transmits the outbound flow, for the conversation, from a port selected from the plurality of ports associated with the minimal equal-cost path;
 monitors for an inbound flow, for the conversation, from the second node on the plurality of ports associated with the minimal equal-cost path;
 if the inbound flow, for the conversation, received from the second node is detected on a first port of the plurality of ports of the first switching device, then associating a network address of the inbound flow with the first port on which it was received; and
 transmit the outbound flow from the first port of the switching device to the second node based on the network address associated with the inbound flow.

11. A method for selecting a port on a first node of a communication network for carrying an outbound flow, the method comprising the steps of:
 at a switching device:
 transmitting the outbound flow, for a conversation, from the first node to a second node;
 identifying a plurality of ports on the first node associated with minimal equal-cost paths to a second node;
 determining whether an inbound flow, for the conversation, received from the second node is detected on a first port of the plurality of ports of the first node;
 associating a network address of the inbound flow with the first port on which it was received;
 selecting the first port for carrying the outbound flow in response to determining that an inbound flow, for the conversation, from the second node is present on the first port; and;
 transmitting the outbound flow from the first port of the first node to the second node based on the network address associated with the inbound flow.

12. The port selection method of claim 11, wherein the minimal equal-cost paths are derived from route information exchanged between the first node and one or more routing devices in the network.

13. The port selection method of claim 11, wherein the method further comprises the step of retaining the network address associated with the inbound flow, for the conversation, in a forwarding database maintained by the first node.

14. The port selection method of claim 13, wherein the forwarding database comprises entries associating network addresses with ports.

15. The port selection method of claim 11, wherein the determining step includes detecting the inbound flow, for the conversation, using address source learning.

16. The port selection method of claim 15, wherein the address source learning associates a source address from an inbound PDU, for the conversation, with a port on which the inbound PDU is received.

17. The port selection method of claim 11, further comprising the step of selecting, using round-robin, a port for carrying the outbound flow, for the conversation, in response to determining that an inbound flow, for the conversation, from the second node is not present on the first port.

18. The port selection method of claim 17, further comprising the step of reassigning the outbound flow, for the conversation, from the round-robin-selected port to the first port in response to determining that an inbound flow, for the conversation, from the second node has become present on the first port.

* * * * *